Feb. 26, 1957
F. P. WILLCOX
2,782,702
PHOTOGRAPHIC SHUTTER
Filed Jan. 31, 1950
2 Sheets-Sheet 1
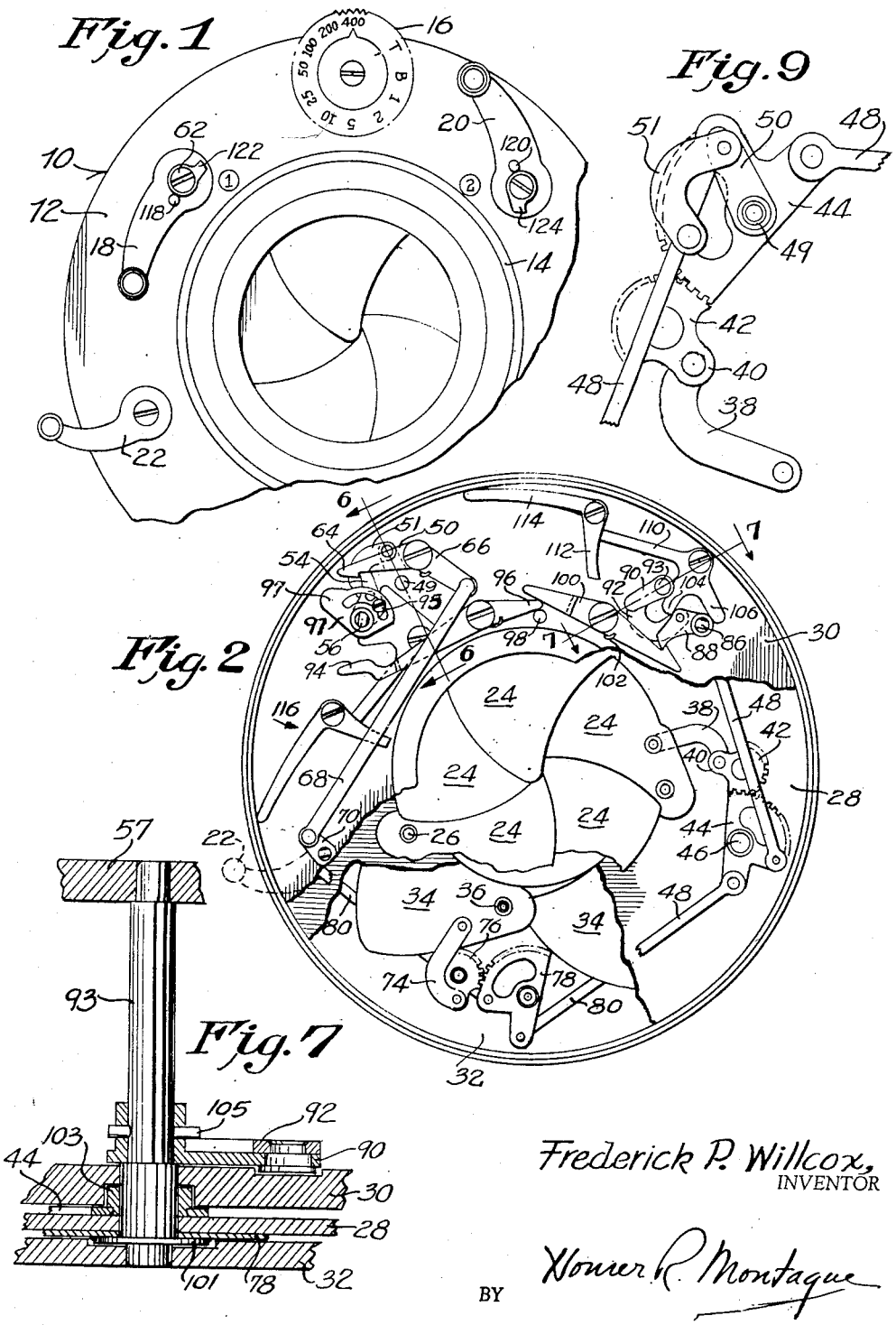
Frederick P. Willcox,
INVENTOR
BY Homer R. Montague
ATTORNEY Feb. 26, 1957 F. P. WILLCOX 2,782,702
PHOTOGRAPHIC SHUTTER
Filed Jan. 31, 1950 2 Sheets-Sheet 2
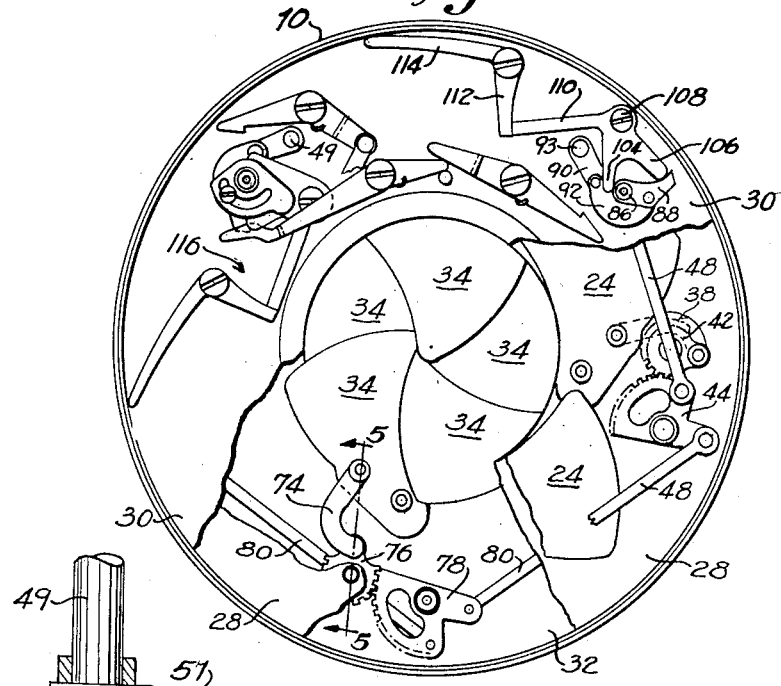
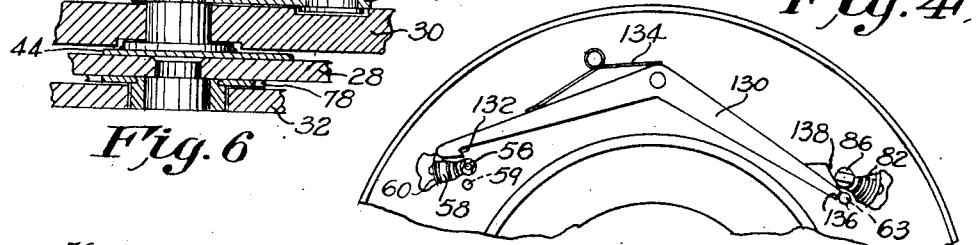
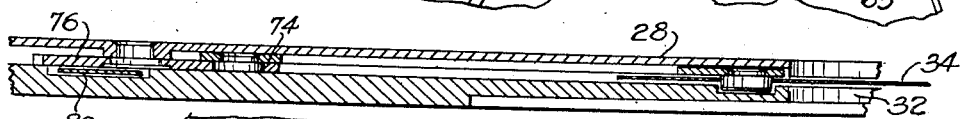
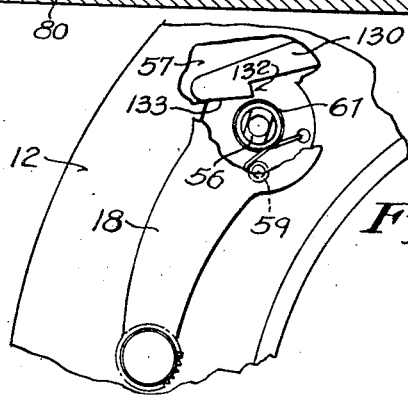
Frederick P. Willcox,
INVENTOR
BY Homer R. Montague
ATTORNEY

United States Patent Office 2,782,702
Patented Feb. 26, 1957

2,782,702
PHOTOGRAPHIC SHUTTER

Frederick P. Willcox, Westmoreland Hills, Md., assignor to Fairchild Camera and Instrument Corporation, a corporation of Delaware Application January 31, 1950, Serial No. 141,495

7 Claims. (Cl. 95—63)

This invention relates to photographic shutters, and especially to photographic shutters of the inter-lens type.

It is an object of the invention to provide an inter-lens shutter characterized by relatively high exposure speeds coupled with relatively high optical efficiency, and in which the reliability, accuracy and ruggedness of the shutter is greatly increased as compared with prior devices of this type.

Another object of the invention is to provide a shutter of the pivoted blade type utilizing two complete and separate sets of blades having individual power means for each set, to provide higher effective speeds without exceeding safe operating stresses in any of the parts.

Another important object of the invention is to provide a shutter of the above type in which the blades are so disposed, and the operating and control mechanisms are so arranged, that all of the parts may be disposed within a shutter casing of circular outline, and which casing shall have an outside diameter no greater than that of a conventional shutter intended for the same lens aperture.

Still another object of the invention is to provide a camera shutter whose operating power is derived from a pair of power springs which are individually wound by separate levers prior to each exposure, and including mechanism for ensuring that the winding levers are operated in proper sequence.

An additional object of the invention is to provide a shutter of the above type in which the individual blade-driving parts need absorb only a fractional part of the force or energy derived from the associated power spring, by means of novel mechanical amplification elements pertaining to each of the pivoted blades.

A still further object of the invention is to provide blade driving linkage utilizing a gear sector arranged for 180° of rotation during movement of the associated blade from "open" to "closed" condition or vice versa, to provide acceleration control during both starting and stopping phases of the motion of each blade.

Another object of the invention is to provide an inter-lens photographic shutter having two sets of blades, in which the parts are so arranged that the thickness of the shutter casing (that is, in the axial direction) may be held to a minimum.

The above and other objects of the invention are achieved by a design conforming to the principles described below in connection with a preferred embodiment of the invention, whose construction is illustrated in the accompanying drawings. It will be apparent, however, that such principles may also be embodied in other and specifically different designs, and the invention is therefore not to be deemed limited to the particular details of the illustrative embodiment to be described, but only by the scope of the claims appended to this specification.

In the drawings,

Fig. 1 is a partial front elevation of an illustrative embodiment of the invention, Fig. 2 is a similar view with the front cover plate of the shutter removed, parts being broken away, and with the shutter in "set" condition ready to make an exposure, Fig. 3 is a view similar to Fig. 2 but showing the parts in the positions they occupy at the completion of an exposure, Fig. 4 is a fragmentary view illustrating parts lying beneath the cover plate and providing an inter-lock between the two spring winding levers, Fig. 5 is an enlarged fragmentary sectional view taken on line 5—5 of Fig. 3.

Fig. 6 is an enlarged fragmentary sectional view taken on line 6—6 of Fig. 2,

Fig. 7 is an enlarged fragmentary sectional view taken on line 7—7 of Fig. 2.

Fig. 8 is an enlarged view of the leftmost portion of Fig. 4, and

Fig. 9 is an enlarged view, in plan, of the parts shown in Fig. 6.

The efforts of inventors and designers to increase the operating speeds of camera shutters in order to meet the requirements of increasingly fast photographic materials have heretofore been so limited by considerations of size, weight, strength of materials and cost, that the shutter of a camera has become the limiting factor in the effective utilization of photographic cameras of the still-picture type. Increases that have been obtained in the motion-stopping ability of such shutters, and particularly of the convenient inter-lens type, have generally been obtained either by a substantial sacrifice in optical efficiency (with a consequent reduction in the quantum of light transmitted at each exposure), or by reducing the size and mass of the moving parts to an extent that has rendered the constructions liable to frequent breakage and generally erratic operation.

It has heretofore been proposed to provide an inter-lens shutter having two separate complete sets of blades, one of which operates to initiate the opening of the exposure aperture and the other to close the same. Naturally, this doubling of the number of blades and the necessity for providing two complete sets of drive elements has resulted in increasing the size of the shutter casing, which is particularly objectionable in shutters of sizes useful with lenses of large aperture. Moreover, and so far as I am aware, such prior shutters have necessitated compromises of a very undesirable nature made necessary by the fact that the two sets of shutter blades must operate in planes which are very close to one another, and without interference either between the blades of the two sets or between the operating and control arrangements therefor. I believe that the principles of design embodied in my present invention for the first time enable the construction of an inter-lens shutter providing maximum top speed with superior optical efficiency and ample ruggedness, all within a casing whose outside dimensions are compatible with the requirements of present-day camera construction.

Referring now to Figs. 1 and 2 of the drawings, there is illustrated a shutter comprising a casing 10 of generally annular configuration and having an annular front plate 12 surrounding a lens tube 14. An exposure timing dial or knob 16 is rotatably mounted near the upper edge of plate 12, and bears indicia of shutter speed (including "time" and "bulb" exposures). To either side of the dial 16 are pivotally mounted the two shutter winding levers 18 and 20, these being shown in their normal positions, from which each is moved in a clockwise direction (as indicated by the arrows in Fig. 1) when it is desired to wind the separate power springs of the mechanism. Also illustrated in Fig. 1, and below setting lever 18, is a pivotally mounted release or tripping lever 22, which is to be depressed in the direction of the arrow pertaining thereto to initiate an exposure.

Referring now especially to Fig. 2 of the drawings, there are illustrated two sets of pivotally mounted shutter blades, the blades of the upper set being shown in closed condition and numbered 24, all of these blades being of the same shape and pivotally mounted equidistantly about the exposure aperture as at 26, these blades being so mounted upon an annular separator plate 28 which lies between the annular main or front plate 30 and a back plate 32. The blades of the second set are shown in open condition in Fig. 2, and these blades are numbered 34, they being of the same profile as the blades 24 and in turn pivotally mounted as at 36 upon the back plate 32.

Pivotally connected to each of the blades 24 is a cranked link 38 whose opposite end is pivoted to an ear 40 integral with a toothed sector 42 which meshes with a toothed fan 44 pivoted as at 46 upon the separator plate 28. There are five blades 24, each limited to substantially 60° of rotation, and each has associated therewith a cranked link, toothed sector and toothed fan as just described. The transmission of power from the power springs to each of the blades 24 is accomplished by tension through a series of connecting links 48 whose ends are pivoted at spaced points on the respective successive toothed fans 44. Referring now to Figs. 2, 6 and 9, it will be seen that the fan 44 nearest winding lever 18 is secured (as by brazing) to a shoulder portion of a shaft 49 journalled in plate 30 and which shaft is fast to a lever arm 50 to which is pivoted a cranked link 51 whose opposite end is pivoted to a latchable crank 54 fast to a shaft 56 (Fig. 2) which extends upwardly through an upper plate 57 lying just beneath cover plate 12 as best seen in Figs. 7 and 8. A spring 61 (Fig. 8) surrounds this portion of shaft 56 and has one end secured to plate 57 and the other engaging a pin 59 depending through an opening in plate 12 from the underside of lever 18, this spring serving to return lever 18 to its Fig. 1 position after completion of the winding of the power spring. A similar return spring and a pin 63 are provided beneath lever 20, the pin 63 being seen in phantom lines in Fig. 4, these functioning to restore lever 20 to its Fig. 1 position after release of the lever upon completion of the winding of spring 82. The winding lever 18 is loose upon the shaft 56 (it may rest upon a shoulder below the upper end of said shaft), and said lever carries an upstanding pin 118 engageable with a lug 122 integral with a collar made fast to the upper end of shaft 56, for example by fitting over a squared portion at the top of the shaft and held in place by a screw 62. A power spring 58 in a stationary drum 60 surrounds shaft 56 just beneath plate 57 (Fig. 4), and has one end fast to the shaft 56 and one end secured to plate 57 by any suitable means.

It is clear that when winding lever 18 is rotated clockwise, pin or shaft 56 and latchable crank 54 will be rotated therewith, winding spring 58. At the end of a full clockwise stroke of lever 18, latchable crank 54 will be engaged by a latch hook 64 of a lever 66 pivoted upon main plate 30 and connected by a link 68 and crank 70 to the shaft of release lever 22, shown in phantom lines in Fig. 2 of the drawings. An inspection of the linkage just described will make it clear that depression of lever 22 will disengage latch hook 64 and permit crank 54 and setting lever 18 to return to their unwound position. In so doing, all of the fans 44 of this set of blades will rotate counterclockwise approximately 90°, and due to the ratio of the gearing between fans 44 and sectors 42, the latter will rotate substantially 180° in the clockwise direction to open blades 24 through the cranked connecting links 38. Each of the blades 24 and their associated parts 38, 42, 44 will then lie in the relative positions indicated at the right of Fig. 3.

The mechanism by which the other set of blades, numbered 34, are now moved from their normally open positions (Fig. 2) to their closed positions (Fig. 3) is similar to that just described. Referring to Fig. 2, there will be found a blade 34 to which is pivotally connected a cranked link 74 pivoted to a toothed sector 76 matching with a toothed fan 78, these fans being connected in series by links 80 corresponding in all respects to the links 48 described above. Driving power for this second set of blades 34 is obtained from a power spring 82 (Fig. 4) having one end secured to a pin or shaft 86 (Fig. 2), the upper end of pin 86 being rotated by winding lever 20. The lower end of pin 86 carries a latchable crank 88 connected as by a lever arm 90 and cranked link 92 to a shaft 93 brazed to that fan 78 (see Fig. 7) of this second set lying nearest the winding lever 20. It is clear that counterclockwise rotation of pin 86 will cause such a movement of link 80 as to rotate blades 34 from their Fig. 2 positions to their Fig. 3 positions to close the shutter aperture, leaving the parts in unwound condition and terminating the exposure.

The fans 44 and 78 of the two sets of fans have their pivotal axes in alignment; that is, for each fan 44 there is a fan 78 mounted somewhat below the former but coaxial therewith. As shown in Figs. 6 and 7, the fans 44 lie between plates 28 and 30, while the fans 78 lie between plates 28 and 32. This being so, it is necessary for the power from spring 82 to be transmitted down the shaft 93 from elements 90 and 92 to the level of the underlying fan 78 without interfering with the operation of the system of fans 44 lying above the fans 78. Referring to Fig. 7, it will be seen that this is accomplished by utilizing the portion of shaft 93 lying in the plane of fans 44 as the pivotal axis of the fan 44 lying just above that fan 78 to which the power is applied. Thus, fan 78 in Fig. 7 is brazed to a collar 101 fast to shaft 93, while fan 44 lying thereabove is secured to a collar 103 passing loosely about shaft 93. Lever arm 90 is secured to shaft 93 at a still higher lever as by a taper pin 105 passing through a boss which is integral with lever arm 90.

Fig. 6 illustrates the manner in which shaft 49 transmits driving power to fan 44 which is secured to said shaft, while a downward extension at the bottom end of said shaft 49 provides a bearing for the loose collar secured to the underlying fan 78.

In order to control the length of time that the shutter remains fully open, at the shortest exposure interval, I provide for the unlatching of the power spring 82 (associated with winding lever 20) under the control of parts associated with the opening of the first set of blades 24. Referring again to Fig. 2, a tripping cam 91 is mounted rotatably about pin 56 and has an arcuate slot through which passes a binding screw 95 threaded into latchable crank 54. Cam 91 can thus be adjusted angularly with respect to crank 54, to control the time of engagement of a nose 97 of cam 91 with one end 94 of a lever pivoted on plate 30 and whose opposite end 96 is normally held against a stop pin 98 by a lever 100 pressed thereagainst by a suitable spring 102. The opposite end of lever 100 is formed with a hook which restrains crank 88 against the tension of power spring 82 when the latter has been wound by rotation of winding lever 20. It is clear from this description that at some predetermined time after the operation of release lever 22 to initiate rotation of crank 54, nose 92 will depress the end 94 of the first pivoted lever, whose other end 96 will give lever 100 a slight clockwise rotation sufficient to disengage its opposite end from crank 88, thereby initiating the closing movement of blades 34 a predetermined time after the initiation of the opening movement of blades 24.

In order to cushion the stopping of the latchable cranks 54 and 88 pertaining to the two sets of shutter blades, each of these is so formed as to engage during its rotation between the angularly disposed arms 104, 106 of a braking lever pivoted as at 108 and having a lateral arm 110 arranged to rub along the arcuate surface 112 of a pivoted lever whose tail portion 114 is slightly resilient and is pressed against the inner surface of casing 10. A comparison of the positions of these parts as they lie in Figs. 2 and 3 will show that one lateral surface of crank 88 gradually impinges upon arm 106 during counterclockwise rotation of the latter, to force arm 110 along arcuate surface 112 with a friction controlled by the pressure applied by the tail portion 114. Also, it is apparent that when setting lever 20 is again wound by a clockwise rotation thereof, the opposite lateral surface of crank 88 will engage arm 104 and restore the braking lever to its Fig. 2 position. Also, it will be understood that the shape of crank 54 pertaining to the set of blades 24 accomplishes the same functions in connection with a duplicate braking mechanism whose detailed description is therefore omitted, but which is indicated generally by numeral 116 in Figs. 2 and 3.

It has heretofore been stated that Fig. 1 of the drawings illustrates the shutter with both of its power springs in wound or shutter-set condition, and it should be understood that the reason that winding levers 18 and 20 are there shown in their counterclockwise positions is due to the fact that these are spring returned to such positions at the completion of the winding motion and prior to the operation of release lever 22. In other words, each of these levers is loose with respect to its corresponding pins 56 and 86, the winding force being transmitted from pins 118, 120 on the corresponding levers, to lugs 122, 124 fast on the corresponding shafts 56 and 86.

The facing surfaces of plates 28, 30 and 32 are recessed or relieved where necessary to provide clearance for the links and other elements which are attached to the shutter blades and associated parts. This construction is illustrated in Figs. 5, 6 and 7, and provides proper support for the blades and associated elements to eliminate unnecessary friction and binding.

It will be observed that the blades 24 are driven from their closed positions to their open positions to start an exposure, and that the exposure is terminated by the movement of blades 34 from their open positions to their closed positions. Thus, the power springs need to drive the respective sets of blades each in only one direction, the blades being restored to their original positions for the next exposure by the winding movements of levers 18 and 20. The fact that each power spring needs to drive the corresponding blades in only one direction makes it possible to obtain very high speeds without stressing the power springs unduly, or, stated in another way, permits higher exposure speeds that would be possible if the power springs had to move the blades in both directions. The principal objection to this double-blade arrangement as described is that it would be possible to make an inadvertent exposure during winding, if lever 20 were to be wound prior to the winding of lever 18, since this would open the blades 34 prior to the closure of blades 24.

The above objection is overcome in the present shutter by the provision of an interlock mechanism best shown in Fig. 4 of the drawings. In that figure, a two-armed lever 130 has its left end provided with a hook or catch portion 132 and a control surface 133 (see also Fig. 8) adapted to be engaged by the pin 59 on lever 18 when the latter is moved a sufficient distance in the clockwise (winding) direction. A spring 134 normally urges lever 130 to its Fig. 4 condition, in which an abutment portion 136 lies in the path of pin 63 depending from lever 20. Thus, winding movement of lever 20 is blocked by portion 136 of lever 130 until after pin 59 on lever 18 has raised lever 130 by pressure against control surface 133. Thereafter, lever 20 may be rotated clockwise to wind the associated power spring. The hook portion 132 at the left end of lever 130 drops behind pin 59 when lever 18 has been moved nearly to wound position, restraining return movement of lever 18. After lever 20 has been fully wound and released for its idle return movement, its pin 63 will engage a cam surface 138 on the right end of lever 130, causing hook 132 to release pin 59 and permit the lever 18 to return to its Fig. 1 position with both springs of the shutter fully wound in preparation for the next exposure.

The importance of utilizing a toothed sector such as sectors 42 and 76 in connection with a multi-blade shutter having links to transmit the power from blade to blade may be realized when it is considered that this permits the pivotal connection of the cranked link (such as 74 in Fig. 3) and the sector 76 to move away from a dead-center position in starting the blade movement, and thence around the axis of the toothed sector to approach a terminal dead-center position in stopping the blades. In other words, this permits a very large application of force to the blade, during both acceleration and deceleration, by the linkage at each blade. If it were necessary to provide this amplifying leverage in the main drive linkage associated with each power spring, the forces that would have to be transmitted by such linkages and through the slender links connecting the fans to one another would be prohibitive.

However, the use of a fan for each blade and links connecting the fans to one another limits the rotation of each fan to substantially less than 180°, 90° being the angle of fan rotation in the present shutter. It is therefore necessary to provide some way of efficiently converting the 90° rotation of the fans to 180 degrees of rotation of the sectors, and this is the reason for the use of a geared connection between these parts. The design factors just mentioned make it possible to provide a high speed shutter which can be used with the larger diameter lenses (for example, those having clear apertures of 2" or greater) without any sacrifice in optical efficiency, and of moderate external dimensions.

I claim:

1. In a photographic shutter, a plurality of blades pivotally mounted about an exposure aperture, means limiting the rotation of each blade to an angle substantially less than 180°, a gear sector pivotally mounted on an axis spaced from the pivotal mounting of each blade, a link pivoted on each blade at a point spaced from the mounting thereof and connected to the corresponding sector, a toothed fan element adjacent each sector and meshing therewith, and means for driving said fan elements simultaneously through an angle of substantially 90° to rotate said blades through their limited angles of rotation.

2. In a photographic shutter, a shutter blade mounted for pivotal movement through an angle not exceeding substantially 60°, a toothed sector mounted for pivotal movement through an angle of substantially 180°, a cranked link connecting a point on said blade with said sector, and a toothed quadrantlike member pivoted adjacent said sector for driving said sector through substantially 180° during movement of said member through a substantially smaller angle.

3. In a photographic shutter, a shutter blade mounted for pivotal movement through an angle not exceeding substantially 60°, a toothed sector mounted for pivotal movement through an angle of substantially 180°, a cranked link connecting a point on said blade with said sector, and a toothed quadrantlike member pivoted adjacent said sector for driving said sector through substantially 180° during movement of said member through an angle of the order of 90°.

4. The invention in accordance with claim 2, including power spring means, and linkage connecting said power spring means to drive said toothed member.

5. In a photographic shutter, a plurality of blades pivotally mounted about an exposure aperture, means limiting the rotation of each blade to an angle substantially less than 180°, a gear sector pivotally mounted on an axis spaced from the pivotal mounting of each blade, the toothed portion of each sector extending for substantially only 180° about its axis, a link pivoted on each blade at a point spaced from the mounting thereof and connected to the corresponding sector at a point spaced 180° from the center of its toothed portion, a fan element pivoted adjacent each sector and having an effective radius larger than that of said sector and having a peripheral toothed portion of angular length substantially less than 180° to engage with the teeth of the corresponding sector, and links connecting all of said fan elements for driving said sectors through substantially 180° to rotate said blades simultaneously.

6. In a photographic shutter, a first set of pivotally mounted blades 24, a second set of pivotally mounted blades 34, the first set 24 being arranged to open and the second set 34 being arranged to close a single exposure aperture for each exposure, a gear sector 42 for each blade 24 and a link 38 connecting each sector 42 to its corresponding blade 24, a gear sector 76 for each blade 34 and a link 74 connecting each sector 76 to its corresponding blade 34, a toothed fan element 44 pivoted adjacent each sector 42 and meshing therewith, a toothed fan element 78 pivoted adjacent each sector 76 and meshing therewith, other links 48 connecting the fan elements 44 to one another for concomitant rotation, still other links 80 connecting the fan elements 78 to one another for concomitant rotation, drive elements comprising members 54, 51, 50 and 49 for driving the sectors 42 through substantially 180° of rotation, drive elements comprising members 88, 92, 90 and 93 for driving the sectors 76 through substantially 180° of rotation, to drive the corresponding blades 24, 34 through a substantially smaller angle to open one set of blades 24 for each exposure and to close the other set 34 for each exposure, and means responsive to movement of the first drive elements for initiating operation of the second drive elements.

7. A photographic shutter in accordance with claim 6, in which said fan elements for the respective sets of blades are located in spaced planes, corresponding fan elements of the individual blades of each set being coaxially mounted, and a pair of drive shafts, one for a fan of each coplanar set of fans, each drive shaft being fixedly secured to a fan element of one set and passing loosely in bearing relationship to the corresponding fan element of the other set.

References Cited in the file of this patent

UNITED STATES PATENTS

| | | |
|---|---|---|
| 1,377,366 | Rose | May 10, 1921 |
| 1,483,465 | Marks | Feb. 12, 1924 |
| 1,848,926 | Barenyi | Mar. 8, 1932 |
| 1,861,257 | Barenyi | May 31, 1932 |
| 2,002,109 | Coursen | May 21, 1935 |
| 2,105,228 | Riddell | Jan. 11, 1938 |
| 2,117,971 | Mihalyi | May 17, 1938 |
| 2,183,802 | Zizelsberger | Dec. 19, 1939 |
| 2,198,729 | Junghans | Apr. 30, 1940 |
| 2,359,116 | Johnson | Sept. 26, 1944 |
| 2,441,675 | Simmon et al. | May 18, 1948 |
| 2,463,206 | Robertson | Mar. 1, 1949 |